United States Patent [19]

Uemiya et al.

[11] Patent Number: 5,214,736
[45] Date of Patent: May 25, 1993

[54] OPTICAL TRANSMISSION LINE HAVING A CORE OF A NON-LINEAR OPTICAL MATERIAL COATED WITH AN IMPROVED CLADDING

[75] Inventors: Takafumi Uemiya; Naoto Uenishi; Akira Mizoguchi; Yasuzi Ohgaki; Yasuhiro Hattori, all of Osaka, Japan

[73] Assignee: Sumitomo Electric Industries, Ltd., Osaka, Japan

[21] Appl. No.: 730,481

[22] Filed: Jul. 16, 1991

[30] Foreign Application Priority Data

Jul. 16, 1990 [JP] Japan .................................. 2-188301
Aug. 7, 1990 [JP] Japan ................................ 2-83861[U]

[51] Int. Cl.$^5$ ............................................. G02B 6/16
[52] U.S. Cl. .................................. 385/144; 385/122; 65/3.11
[58] Field of Search ............... 385/122, 123, 141-144; 65/1, 3.12, 2, 36, 3.11

[56] References Cited

U.S. PATENT DOCUMENTS 4,846,548  7/1989  Klainer ........................... 385/145
5,093,882  3/1992  Asano et al. ................... 385/143

*Primary Examiner*—John D. Lee
*Assistant Examiner*—John Ngo
*Attorney, Agent, or Firm*—Cushman, Darby & Cushman

[57] ABSTRACT

A single crystal non-linear optical transmission line is manufactured by using a cladding made of a glass material that eliminates or reduces the formation of an uneven inner wall of an optical fiber cladding made of a glass mother material. The improved glass material suppresses the elution of metal mono-oxides on the inner wall and results in a high yield of non-defective fiber manufacturing. A glass mother material, such as SF1, having a low concentration of lead oxide does not contribute to the elution problem common to higher concentration glass mother materials. A glass mother material having no metal oxides also overcomes the problem of elusion since substitute molecules, such as TaC6, do not elute in water or in acid solutions. These glass materials can be used to successfully form a non-defective core having a low refractive index layer of the inner wall and make possible single mode propagation of a laser light in a single crystal non-linear optical transmission line.

23 Claims, 1 Drawing Sheet

OPTICAL TRANSMISSION LINE HAVING A CORE OF A NON-LINEAR OPTICAL MATERIAL COATED WITH AN IMPROVED CLADDING

BACKGROUND OF THE INVENTION

1. Field of the Invention

This invention relates in general to fiber optic transmission lines. More specifically the invention is directed to a fiber optic transmission line having a single crystal core having a non-linear optical characteristic and a glass cladding surrounding the core.

2. Description of Related Art

One of the most important applications for semiconductor lasers is for use in digital optical communications systems. The development of the laser and the optical fiber has brought about a revolution in communication system design. The optical fiber is a dielectric waveguide. A light wave transmitted into the fiber at one end can propagate through the fiber with very low attenuation making possible transmission over very long distances without amplification.

Attenuation of laser light is a limiting factor in optical fiber communications. There is always a maximum transmitter power level and a minimum useful received power level. The difference between these two represents transmission loss due primarily to fiber attenuation.

When light, such as from a laser, is incident upon any discontinuity in a communication medium, such as an optical fiber, some energy will be reflected from the discontinuity. In some cases the discontinuity is due to random irregularities or imperfections in an otherwise uniform medium. By eliminating such deformations in an optical medium, losses due to attenuation and reflection are minimized significantly.

Conventional fiber optic transmission lines comprise a core surrounded by a glass cladding. The propagation of a beam of light in the core of an optical fiber generates non-linear optical effects, such as second-harmonic generation, proportionate to the intensity of the beam. The non-linear optical phenomena become appreciable for light beams of higher intensity. Functional non-linear optical waveguide devices are essentially designed and fabricated based on their response to a specific intensity light beam.

The phenomena of second-harmonic generation is critical in the domain of non-linear optics because a incident wave characteristically will undergo wavelength conversion. A fiber optic transmission line must be designed that is best suited (i.e., minimize losses) for propagation of light beams.

Second harmonic generators designed to read and write to/from an optical medium such as an optical disk are well known. Optic fiber transmission lines having a single crystal core surrounded by a glass cladding are commonly used as a communication medium to/from such optical devices. The core generally used to propagate high intensity light is constructed of a single crystal dielectric material. Any material may be suitable for wavelength conversion if signal (laser light) losses are minimized. Moreover, wavelength conversion efficiency can be made high by making the refractive index of the cladding lower than that of the core by a relatively small ratio resulting in an incident laser light that is propagated in a single mode.

The following is an example of single mode non-linear optical transmission. An optical fiber has a core made of a single crystal of a non-linear optical material and having a refractive index of 1.78. The clad is made of SF11 glass or SFS3 glass having a refractive index of 1.76. Laser light having a wavelength of 0.82 microns is transmitted into the fiber. The light propagates in a single mode and second-harmonic wave is generated with a calculated conversion efficiency of 1% from incident laser light of 1 W, at a fiber length of 10 mm. The SF11 and SFS3 glass cladding contain predetermined quantities of lead oxide (PbO) in order to improve the refractive index that will result in a suitable single mode fiber using the non-linear optical material as a core.

Conventional manufacturing techniques require first forming a cylindrical glass mother material. Several kinds of metal oxide powder of raw materials adhere to the glass mother material during formation and it becomes necessary to wash the glass mother material with an acid solution to remove the surface powders and impurities. However, metal mono-oxide (RO), where R represents a metal atom and O represents an oxygen atom, such as lead oxide (PbO) or the like, easily elute into water or into an acid. The glass mother material that will be used to form the cladding will not be of sufficient water resistance or acid resistance and will result in elusion of metal oxides on the surface of the glass mother material.

Accordingly, when a glass mother material is worked into the shape of a capillary tube so as to form a cladding, uneven portions are formed on the inner wall of the capillary tube attributed to the lead oxide elutions on the glass mother material. These elusion defects are referred to as stain or dimming.

When a single crystal core is made to grow in the capillary tube, dislocation (a defect related to cracking) and peeling from a cladding may be generated in the crystal under influence of the preexisting uneven portions of the capillary tube, so that the propagation losses become high. The problem occurs frequently resulting in a high rate of defective output during formation of fiber optic transmission lines. Furthermore, a low refractive index layer attributed to the eluted metal oxide molecules is present on the inner wall of the capillary tubes. Refractive indices of this layers are different between production.

Therefore, stable manufacturing of a single mode fiber becomes difficult.

SUMMARY OF THE INVENTION

In view of the problems described above, it is an object of this invention to provide a fiber optic transmission line in which a core having a single crystal and having non-linear optical characteristics is easily formed resulting in superior yield.

In a first embodiment of the present invention, a glass mother material such as SF1 glass having a low concentration of lead oxide is used to form the clad surrounding the core.

In a second embodiment of the present invention, a glass mother material made of TaC6 glass having no metal mono-oxide concentration is used to form the glass clad surrounding the core.

The improved cladding material suppresses the elution of metal oxides on the inner wall and results in a high yield of non-defective fiber manufacturing.

The glass clad successfully forms a non-defective core. The single crystal non-linear optical transmission line consisting of the glass clad and the formed core can be used to transmit a laser light in a single mode.

DETAILED DESCRIPTION OF THE PREFERRED EMBODIMENTS

Figure 1:
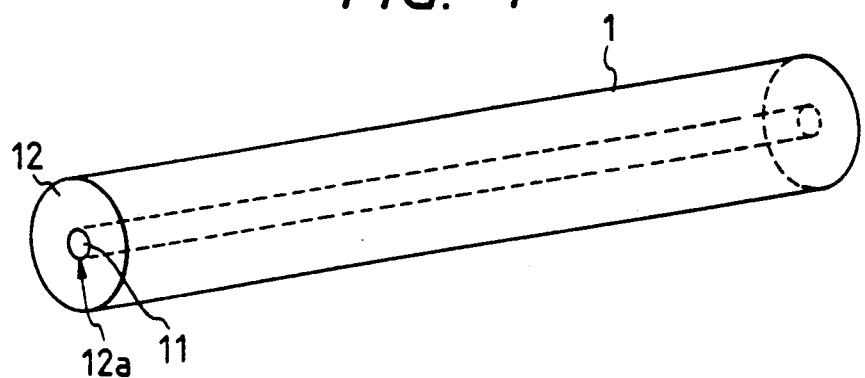
FIG. 1 shows a schematic constituent view of a typical fiber optic transmission line comprising a core and a cladding.

FIG. 1 is a schematic constituent view of a typical fiber optic transmission line. A fiber optical transmission line is shown having a core 11 made of a single crystal of a non-linear optical material and a glass cladding 12. The optical transmission line 1 can have a total length between the range of several millimeters (mm) short to 10 mm long and is to be used as a wavelength conversion element such is found in systems employing techniques for propagation of laser light in the core.

The types of waveguide dielectrics constituting a core 11 that are known to exhibit non-linear optical phenomena include, but are not limited to, 2-methyl-4-nitroaniline (MNA), 4-(N,N-dimethylamino)-3-acetamide nitrobenzene (DAN), and 3,5-dimethyl-1-(4-nitrophenyl) pyrazole (PRA). Of these, PRA is the preferred non-linear optical material for improving wavelength conversion efficiency. PRA has a large second order non-linear optical coefficients for second harmonic generation and a short cutoff wavelength which results in minimum laser light loss or attenuation.

The clad 12 is a capillary tube having an outer diameter of several hundred microns to several mm and an inner diameter no larger than several microns. The PRA crystal core 11 can be formed in the capillary tube by a technique conventionally defined as the Bridgman technique.

Figure 2:
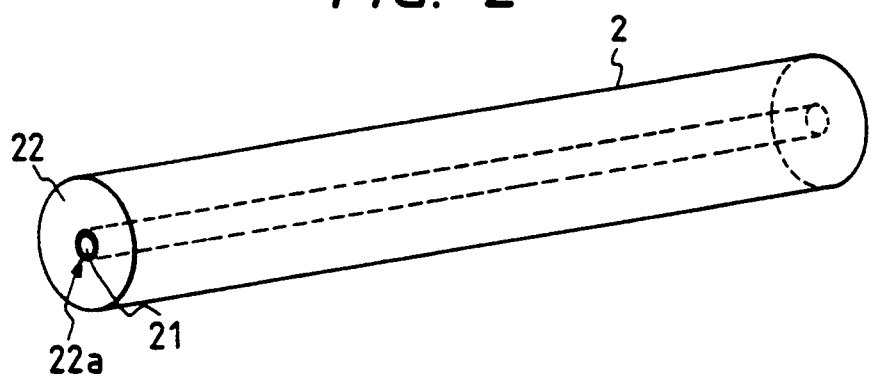
FIG. 2 shows a schematic constituent view of the first embodiment of an optical transmission line comprising a glass cladding formed from SF1 type glass.

In FIG. 2, a non-linear optical transmission line 2 is shown in which a core 21 made of a single crystal of a non-linear optical material is surrounded by a cylindrical cladding 22. The concentration of metal mono-oxide in a glass mother material used to form the clad 22 is lowered to a level that suppression of forming discontinuities due to elution of metal atoms on the inner wall 22a of the cylindrical clad 22 is made possible. This facilitates growth of the single crystal non-linear optical material that forms the core 21 on a smooth, continuous, and refractive inner wall 22a of the capillary tube.

In this first embodiment, the SF11 or SFS3 glass used in conventional prior art systems to form a cladding 22 can be substituted with either an SF1 glass or an SF15 glass. Both SF1 and SF15 have lower level concentrations of lead oxide than the conventionally used SF11 or SFS3. Accordingly, when the glass mother material (SF1 glass or SF15 glass) is worked into the capillary tube to form the clad 22, it becomes possible to prevent discontinuities from being formed on an inner wall 22a of the clad 22 by conventional elusion defects such as stain or dimming. A single crystal made of a non-linear optical material which will form the core of the optical transmission line can be grown in a smooth capillary tube having no uneven portions making possible formation of a single crystal that is free of defects such as dislocation, cracking, and the like, common to prior art non-linear optical waveguides formed with SF11 glass or SFS3 glass.

The following test results are presented in support of the disclosed first embodiment:

TEST EXAMPLE 1

A cladding was prepared in the form of a capillary tube. SF1 glass containing lead of 15.6 weight % and having an inner diameter of 1 $\mu$m and an outer diameter of 1 mm was used. A single crystal of PRA was grown as a core in the capillary tube using the Bridgman technique. By observation of the single crystal through a polarization microscope, it was recognized that the single crystal was grown over a length of 50 mm in a preferable condition with no defects discoverable (i.e., as a crack or the like) and exhibiting no peeling from the cladding

TEST EXAMPLE 2

In place of the SF1 glass in the above test example 1, SF15 glass was used having lead of 49.1 weight %. As in test example 1, it was recognized that the single crystal was grown over a length of 50 mm in a preferable condition with no discoverable defects and no peeling from the clad.

COMPARATIVE EXAMPLE 1

In place of the SF1 glass in the above test example 1, SF11 glass containing lead of 59.8 weight % was used. As a result, only a single crystal having a length of about 10-20 mm was grown.

TEST EXAMPLE 3

A single crystal of DAN was grown through the Bridgman technique in each of ten capillary tubes of SF1 glass and having an inner diameter of 1.5 $\mu$m and an outer diameter of 1 mm. As a result, single crystals of 20-50 mm long were grown in seven of the ten capillary tubes.

COMPARATIVE EXAMPLE 2

In place of the SF1 glass in the above test example 3, SF11 glass was used. As a result, single crystals of 10-20 mm long were grown in two of the ten capillary tubes. In the other capillary tubes, either poly-crystals or spiral crystals were grown.

From the above test examples 1-3 and comparative examples 1-2, it is found that a non-linear fiber optic transmission line having a non-defective single crystal constituting a core can be manufactured with good yield and performance characteristics according to the present invention.

Figure 3:
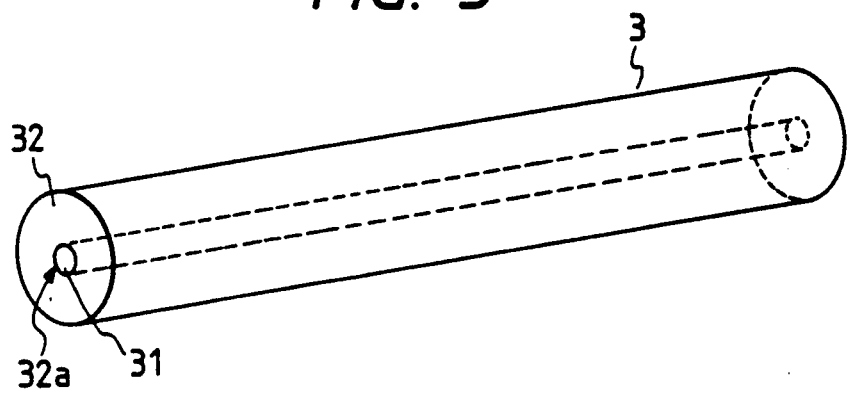
FIG. 3 shows a schematic constituent view of the second embodiment of an optical transmission line comprising a glass clad formed from TaC6 type glass.

In a second embodiment of the present invention, shown in FIG. 3, the SF11 or SFS3 type glass used to form clad 32 was substituted with a clad made of glass containing no metal oxide.

In the optical transmission line having the configuration described above, the clad 32 is formed with glass containing no metal mono-oxide that would easily elute into water or into an acid. Hence, there can be no possibility that uneven portions or surface discontinuities will be formed on the clad inner wall 32a under the influence of stain, dimming, or the like otherwise caused by eluted metal mono-oxides. Moreover, it becomes ultimately possible to suppress the formation of a low refractive-index layer on the cladding inner wall also contributed by the eluted mono-oxides.

After formation of a cylindrical glass mother material of glass containing no metal oxide, the glass mother material are washed so as to be removed in an acid. Next, the glass mother material is subjected to wire-drawing and shaped into a capillary tube with predetermined inner diameter forming the clad 32. A single crystal of a non-linear optical material which constitutes the core 31 is then formed in the capillary tube by means of any conventional waveguide fabrication method such as the better known Bridgman technique.

In the optical transmission line 3, the clad 32 is thus formed of glass containing no metal mono-oxide which would easily elute into water or into an acid solution. The clad 32 thus exhibits properties of high water-resistance and acid-resistance since metal oxides never elute onto the capillary inner wall 32a of the cladding 32 during washing in a manufacturing step. Accordingly, there is no possibility that surface discontinuities will be formed on the clad inner wall 32a under the influence of stain, dimming, or the like that otherwise result from the eluted metal oxide molecules.

Lead, barium, strontium, potassium, cadmium, are typical metal atoms that combine to form metal mono-oxide that may be found in glass clads.

Examples of glass containing no metal oxides include glass in a group of TaC, glass in a group of TaF, glass in a group of TaSF, and the like.

The following test results support a finding of increased yield in the manufacture of non-defective single crystal non-linear optical transmission lines formed with glass cladding containing no metal mono-oxides:

EVALUATION TEST 1

A capillary tube was selected made of glass of group TaC6 containing no metal mono-oxides and having an inner diameter of 1 μm and an outer diameter of 1 mm. A single crystal of PRA was grown as a core in the capillary tube using the Bridgman technique. As a result, the single crystal was grown over a length of 50 mm in a preferable condition with no defects discoverable, (i.e., a crack or the like) and exhibiting no peeling from the clad.

In a comparison test, conventional SF11 was used in place of the TaC6 in the above test. As a result, only a single crystal having a length of about 5-10 mm was grown.

The tests above revealed that a core of a preferable single crystal having no defect could be manufactured with improved yield by substitution of a non-metal mono-oxide cladding.

EVALUATION TEST 2

In a different comparison test, a capillary tube of SF11 glass used in the above evaluation test 1 was dipped in a nitric-acid aqueous solution of 0.01 mol/l at 15° C. for 20 minutes. The reduction of lead oxide in the SF11 glass was observed using EDX (energy diffusion-type X-ray) spectrum analysis. An interference color was observed by using an optical microscope and formation of a low refractive-index layer was recognized.

Similarly, the capillary tube of TaC6 glass used in evaluation test 1 was dipped in a nitric-acid aqueous solution as described above. This time, no interference color was observed.

The results indicate that it is possible to suppress formation of a low refractive index layer on the inner wall of the cylindrical capillary tube by reducing or eliminating the glass concentration of metal mono-oxides present in the glass mother material used for formation of the clad 12 in a non-linear optical transmission line.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. An optical transmission line comprising:
   a core made of a material having a non-linear optical characteristic; and,
   a glass cladding having an inner cylindrical wall surrounding the core, the cladding having a predetermined concentration of metal mono-oxides, the concentration of metal oxides not being attributable to the elution of metal oxide deposits on said inner cylindrical wall during the formation of said cladding from a glass mother material.

2. The optical transmission line of claim 1, wherein concentration of lead is smaller than 50 weight %.

3. The optical transmission line of claim 1, wherein the cladding is formed from SF1 glass.

4. The optical transmission line of claim 3, wherein said core is of sufficiently small diameter to propagate light of predetermined wavelength in a single mode wave.

5. The optical transmission line of claim 3, wherein a diameter of said inner cylindrical wall is smaller than 3 μm, an outer diameter of said cladding is larger than 1 mm, and said optical transmission line has a length greater than 50 mm.

6. The optical transmission line of claim 3, wherein said SF1 glass contains a lead concentration of 15.6 weight %.

7. The optical transmission line of claim 1, wherein the cladding is formed from SF15 glass.

8. The optical transmission line of claim 7, wherein said core is of sufficiently small diameter to propagate light of predetermined wavelength in a single mode wave.

9. The optical transmission line of claim 7, wherein a diameter of said inner cylindrical wall is smaller than 3 μm, an outer diameter of said cladding is larger than 1 mm, and said optical transmission line has a length greater than 50 mm.

10. The optical transmission line of claim 7, wherein said SF15 glass contains a lead concentration of 49.1 weight %.

11. The optical transmission line of claim 1, wherein said core is of sufficiently small diameter to propagate light of predetermined wavelength in a single mode wave.

12. The optical transmission line of claim 1, wherein a diameter of said inner cylindrical wall is smaller than 3 μm, an outer diameter of said cladding is larger than 1 mm, and optical transmission line has a length greater than 50 mm.

13. A method for forming an optical transmission line comprising the steps of:
   forming a cladding from a glass mother material, the cladding having an inner cylindrical wall and a predetermined concentration of metal oxides, the concentration of metal oxides not being attributable to the elution of metal oxide deposits on said inner cylindrical wall during the formation of said cladding from said glass mother material; and, growing a core, having a non-linear optical characteristic, within said inner cylindrical wall.

14. The method of claims 13, wherein said glass mother material is SF1 glass.

15. The method of claim 14, wherein said core is of sufficiently small diameter to propagate light of predetermined wavelength in a single mode wave.

16. The method of claim 14, wherein said inner cylindrical wall has a diameter of 1 μm, said cladding has an outer diameter of 1 mm, and said optical transmission line has a length greater than 50 mm.

17. The method of claim 14, wherein said SF1 glass contains a lead concentration of 15.6 weight %.

18. The method of claim 13, wherein said glass mother material is SF15 glass.

19. The method of claim 18, wherein said core is of sufficiently small diameter to propagate light of predetermined wavelength in a single mode wave.

20. The method of claim 18, wherein said inner cylindrical wall has a diameter of 1 μm, said cladding has an outer diameter of 1 mm, and said optical transmission line has a length greater than 50 mm.

21. The method of claim 18, wherein said SF15 glass contains a lead concentration of 49.1 weight %.

22. The method of claim 13, wherein said core is of sufficiently small diameter to propagate light of predetermined wavelength in a single mode wave.

23. The method of claim 13, wherein said inner cylindrical wall has a diameter of 1 μm, said cladding has an outer diameter of 1 mm, and said optical transmission line has a length greater than 50 mm.

* * * * *